UNITED STATES PATENT OFFICE.

JOSEPH TURNER, OF HUDDERSFIELD, ENGLAND.

DIRECT COTTON DYE.

No. 888,942.     Specification of Letters Patent.     Patented May 26, 1908.

Application filed February 23, 1907. Serial No. 358,895.

*To all whom it may concern:*

Be it known that I, JOSEPH TURNER, a subject of King Edward VII of Great Britain, and resident of Huddersfield, in the county of York, England, have invented certain new and useful Improvements in Direct Cotton Dyestuffs, of which the following is a specification.

The object of my invention is, by the admixture with certain direct dyeing cotton colors, or a combination of such colors, of suitable organic acid or inorganic salt or salts which dissociate in a heated bath to produce an improved direct cotton dye-stuff or composition of matter by which brilliant and beautiful shades can be produced which are fast to light and to alkalies.

In the course of investigation, I have found that by mixing together certain direct cotton dyeing colors, or a combination of certain direct dyeing colors, with a proportion of a suitable organic acid, such as oxalic or tartaric, an inorganic acid salt, such as hydrogen sodium sulfate, or any salts which dissociate in a heated dye bath, such as ammonium acetate, that such mixtures possess good dyeing qualities, and produce extremely brilliant and beautiful shades. Furthermore, the shades produced show decided advantages over the shades produced by the individual component dye-stuffs, such as increased fastness to light, to alkalies, and in point of brilliance. In one mixture, the following colors have been found suitable for the said purpose:—The sulfonated mono-di or tri-beta naphthylated rosanilins, with which the acid or salt above named is mixed. In another mixture, the sulfonated mono-di or tri-beta naphthylated rosanilins on the one hand with the known cotton colors derived from benzidin, tolidin, dianisidin, or other similar para-diamins on the other hand are combined and mixed with the aforesaid acid or salt.

The proportions of the different ingredients may vary very widely according to the shade and properties required in individual cases.

It will be understood that the mixture or composition of matter must comprise the ingredients mentioned in the first or second mixtures. The mixture of the acid or salt with the known cotton colors derived from benzidin, tolidin, dianisidin or other similar para-diamins would give no advantageous result.

In carrying out this invention I may use 50 parts sulfonated tri beta naphthylated rosanilin, 50 parts chlorazol blue, 10 parts oxalic acid.

No advantage is found in mixing the oxalic acid with the chlorazol blue if the first mentioned ingredient is omitted, but it is advisable to add the chlorazol blue so as to increase the fastness of the dye to alkalies and at the same time retain its maximum brilliance.

The other chemical substances hereinbefore mentioned which may be used instead of oxalic acid are its chemical equivalents in carrying out this invention; and sulfonated dibeta naphthylated rosanilin is the chemical equivalent of sulfonated tri beta naphthylated rosanilin in carrying out this invention, on account of the presence of sulfonic acid in each of these chemical substances.

In carrying out this invention from 5 to 30 parts of the suitable acid, such as oxalic acid and its chemical equivalents substantially as described, may be added to the sulfonated naphthylated rosanilin.

What I claim is:

1. A dye-bath, comprising sulfonated napthylated rosanilin to which a suitable acid is added substantially as described.

2. A dye-bath, comprising sulfonated naphthylated rosanilin, and chlorazol color, to which a suitable acid is added substantially as described.

In testimony whereof I affix my signature in the presence of two witnesses.

JOSEPH TURNER.

Witnesses:
EDWARD COCKSHAW.
THOMAS H. BARRO...